Nov. 13, 1951  F. R. POLLARD ET AL  2,575,123
AUTOMATIC JACKET AND WEIGHT SHIFTER
FOR SNAP FLASK MOLD CONVEYERS
Filed Oct. 29, 1948  10 Sheets-Sheet 3

Inventors
Frank R. Pollard and
Charles M. Young, Jr.

By L. Donald Myers

Attorney

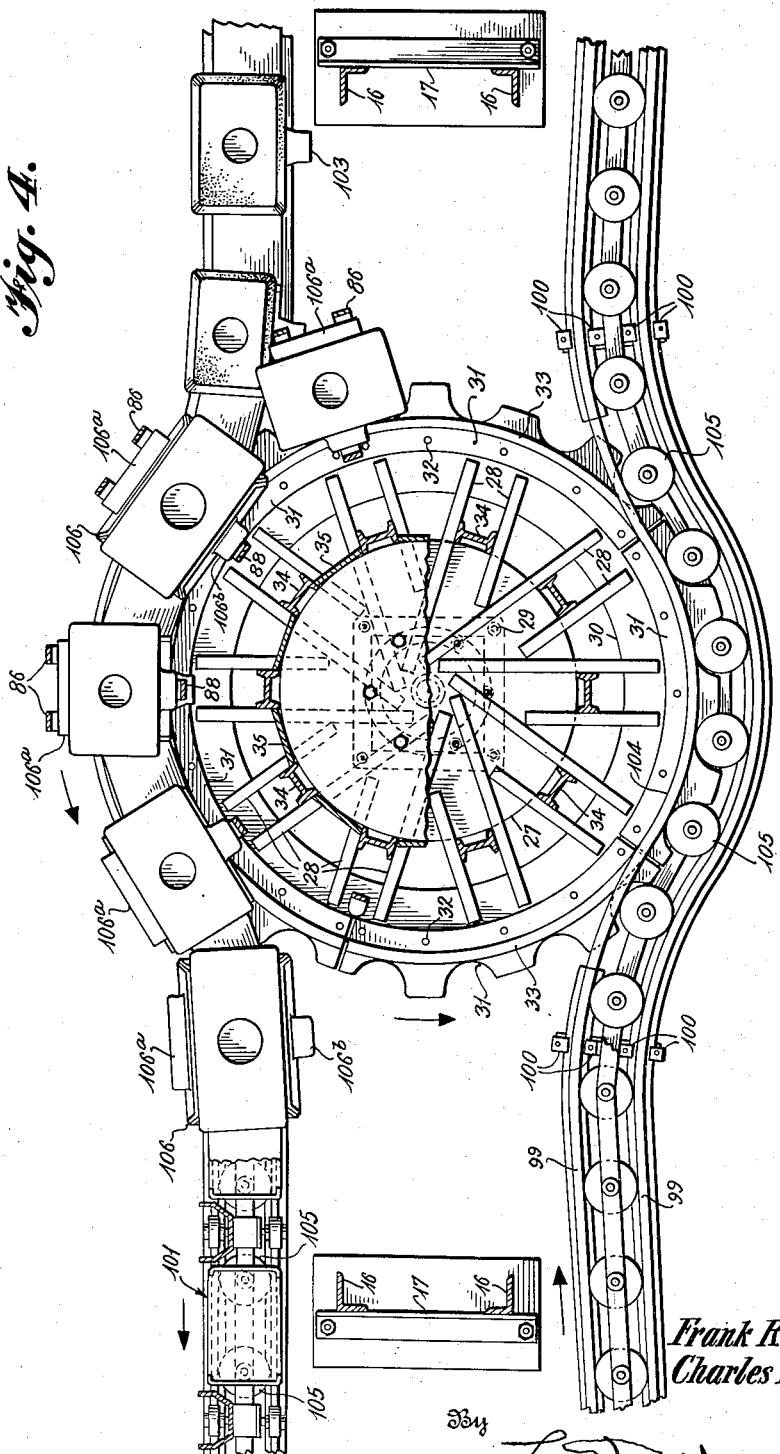

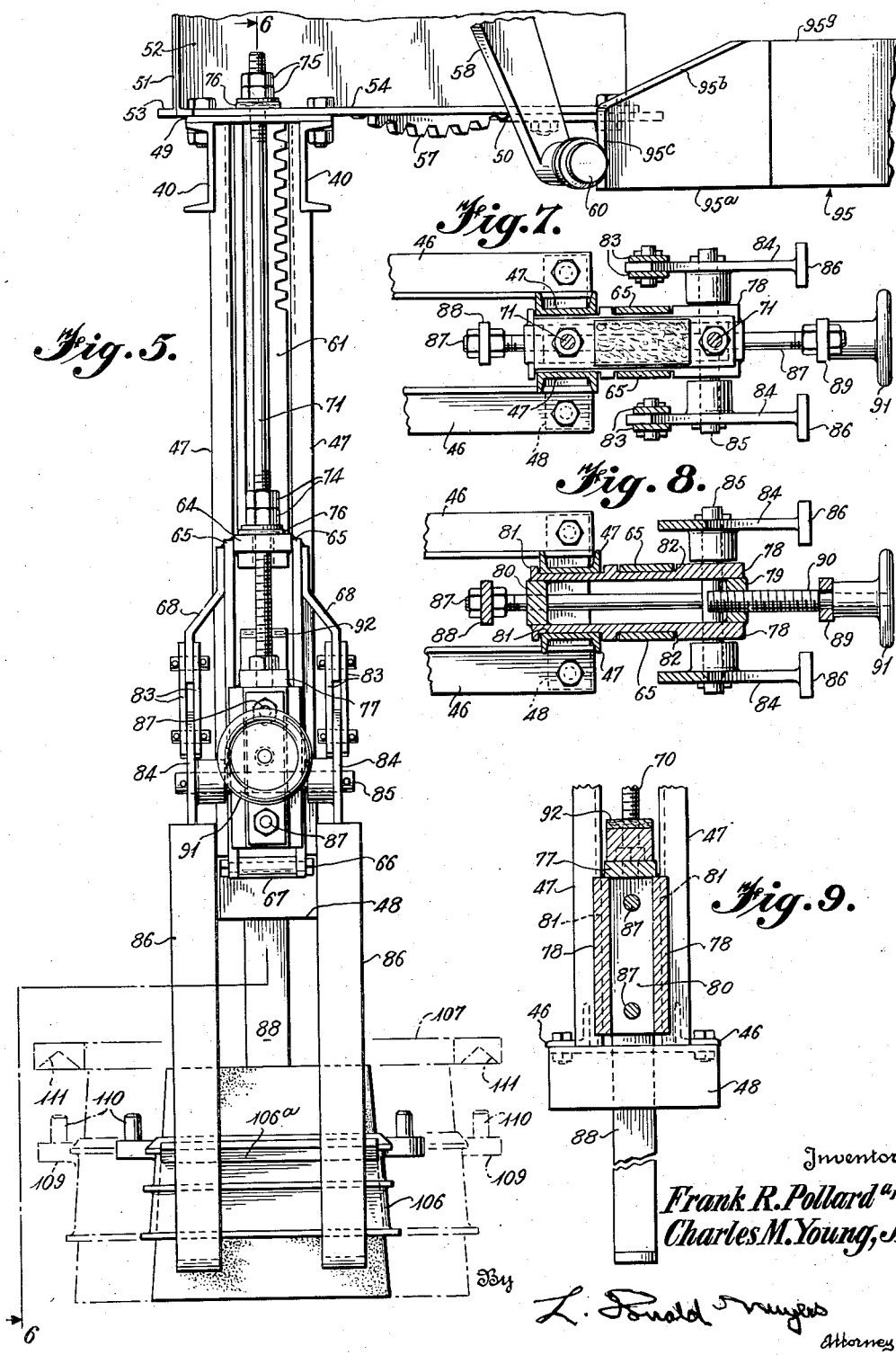

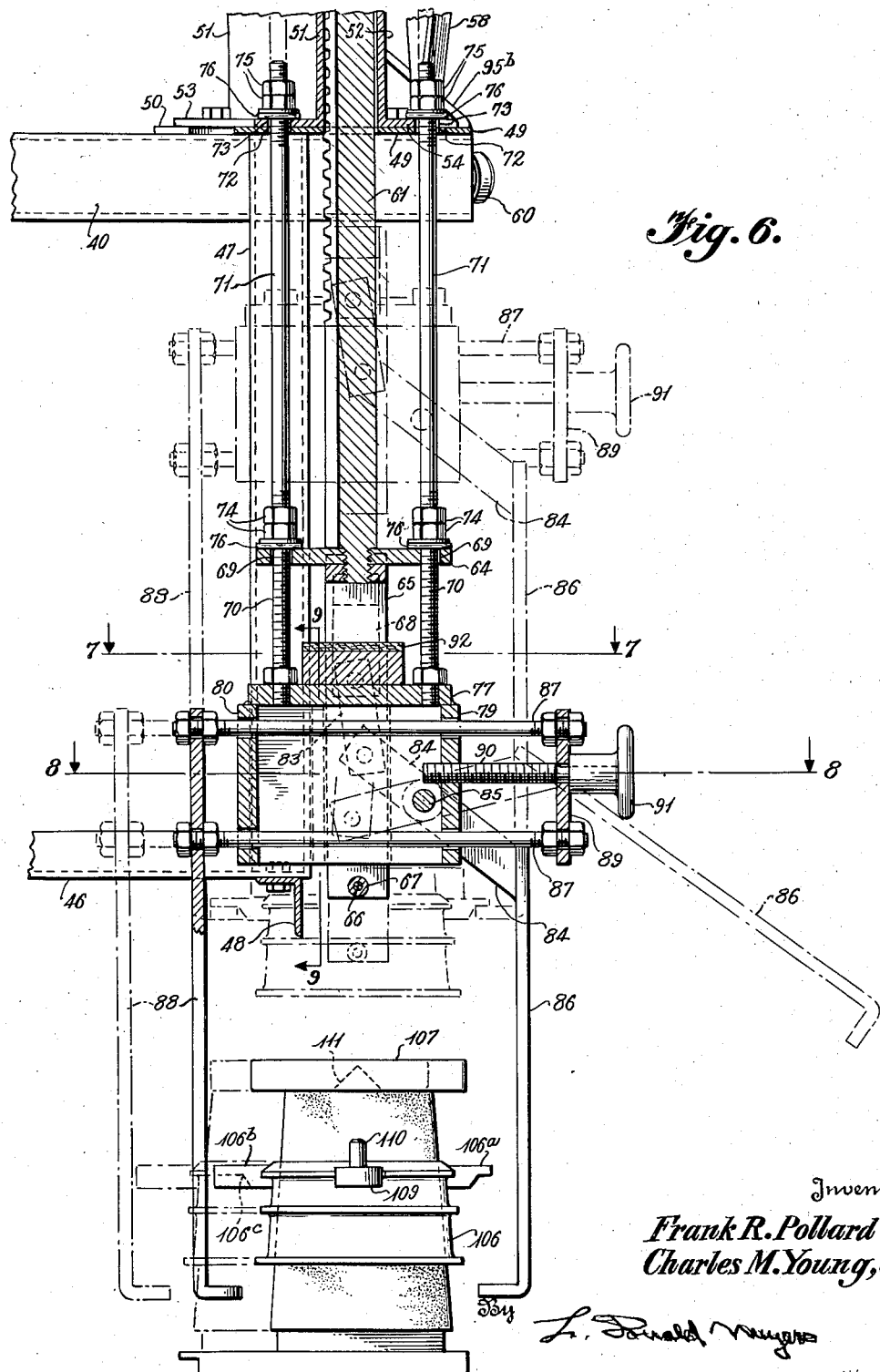

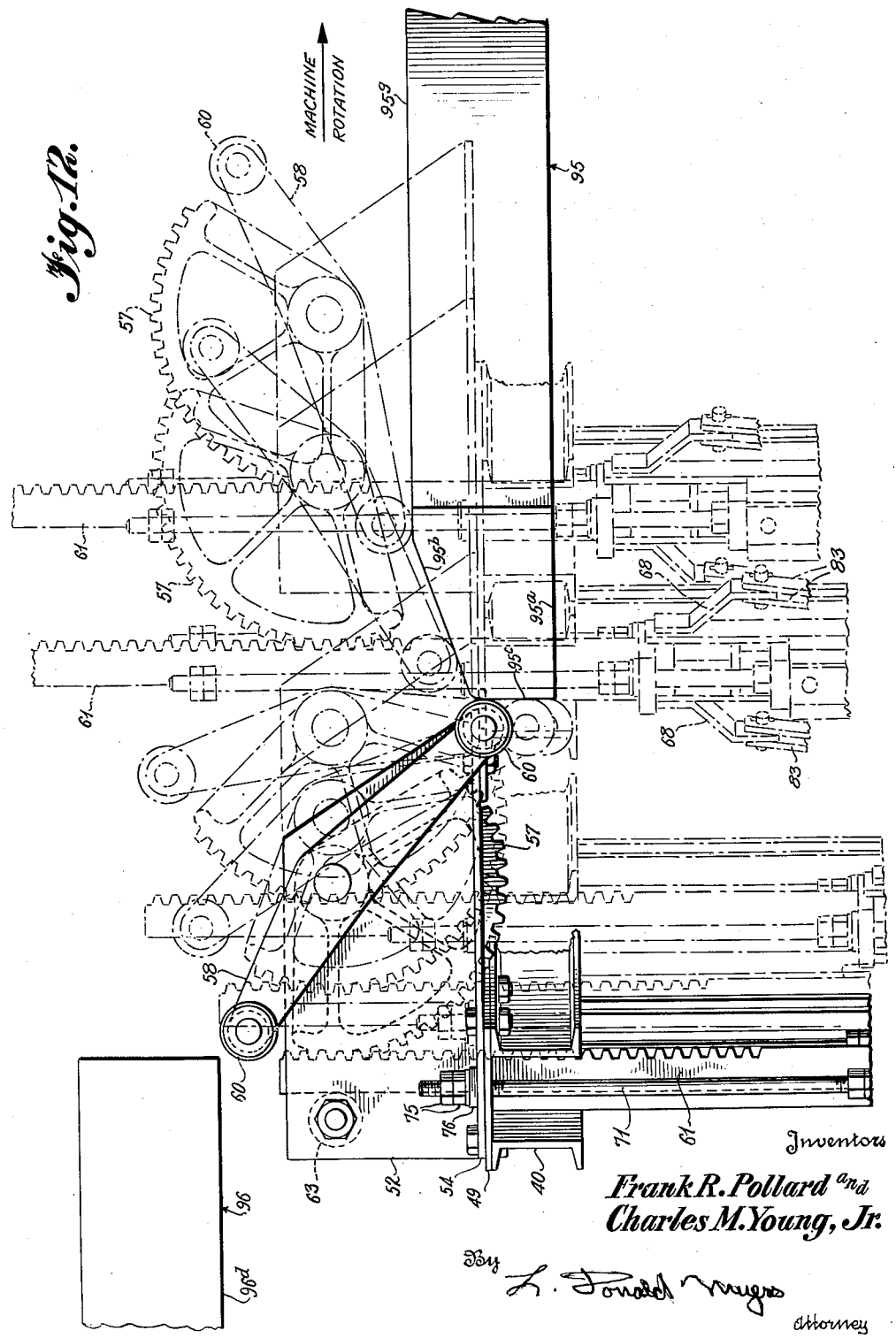

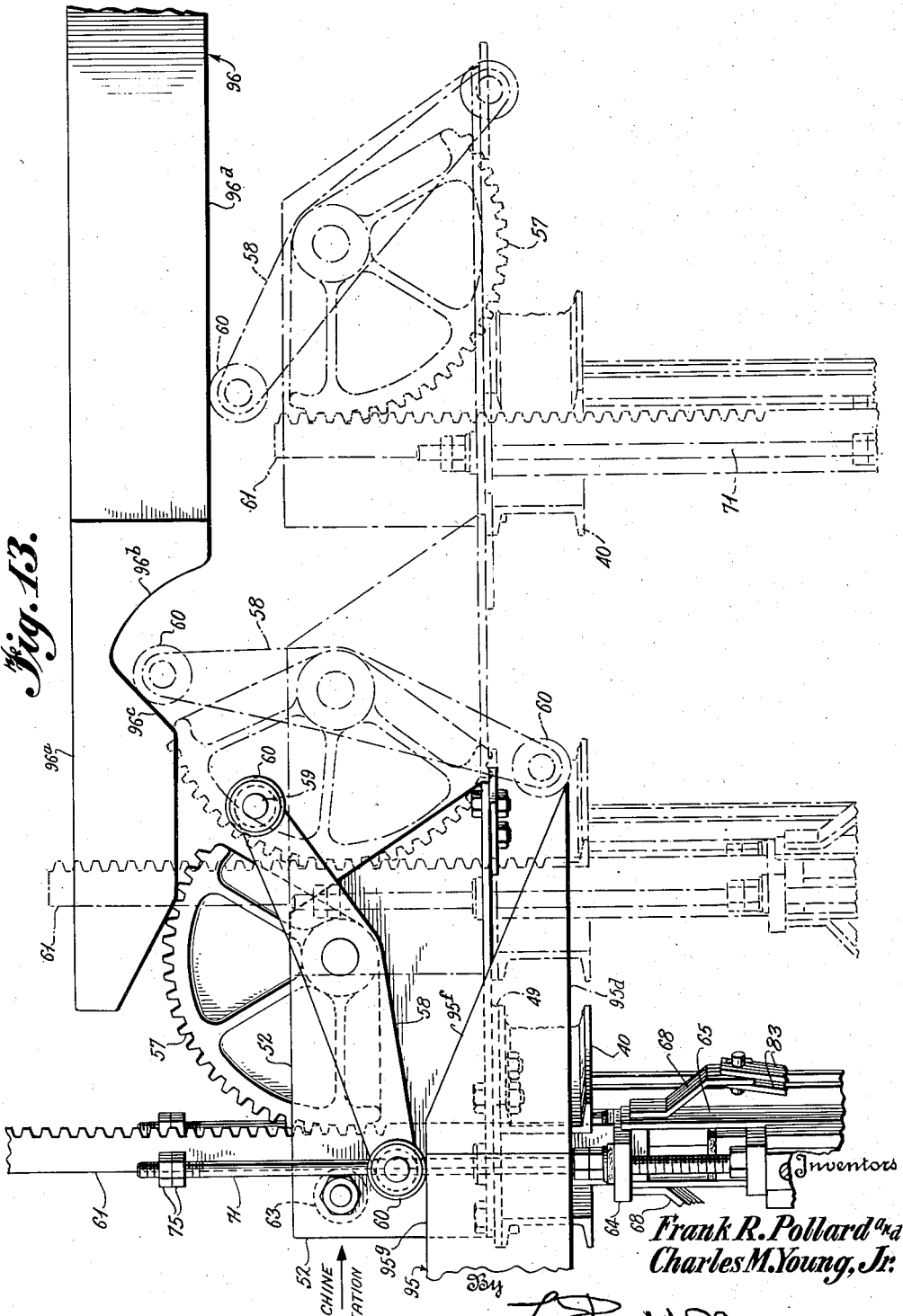

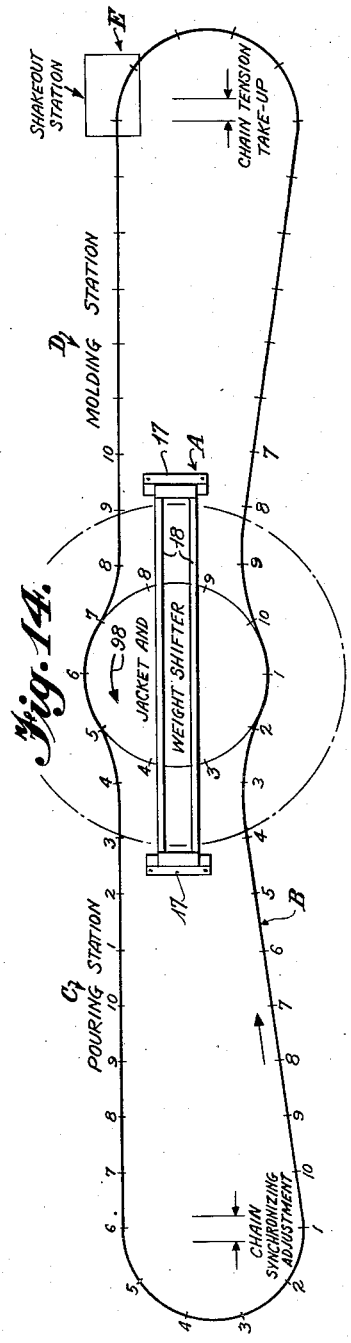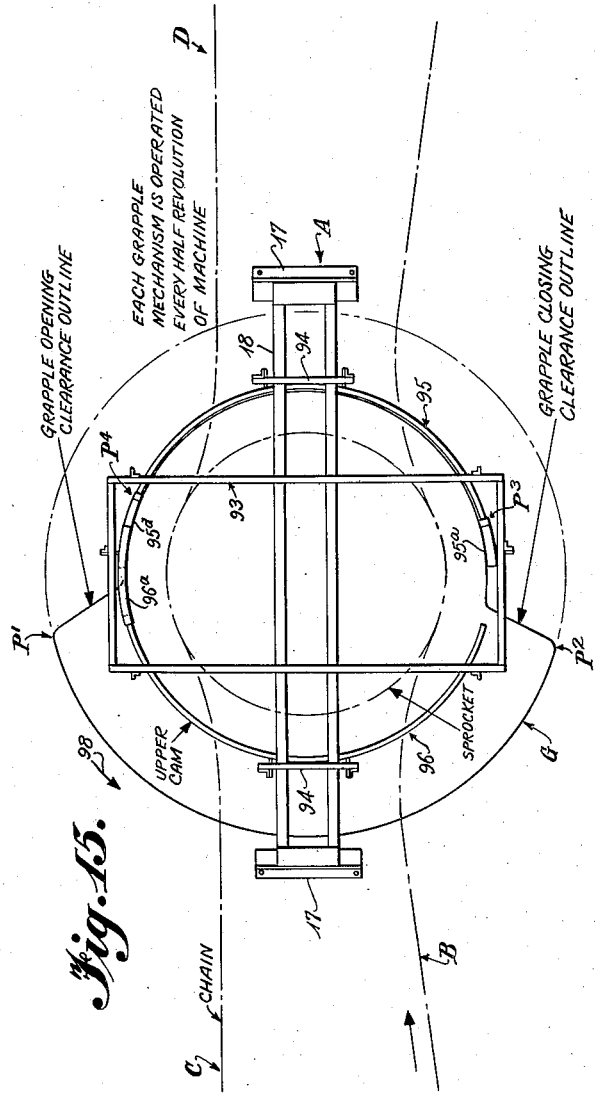

Patented Nov. 13, 1951

2,575,123

UNITED STATES PATENT OFFICE 2,575,123

AUTOMATIC JACKET AND WEIGHT SHIFTER FOR SNAP FLASK MOLD CONVEYERS

Frank R. Pollard, Indianapolis, Ind., and Charles M. Young, Jr., Philadelphia, Pa., assignors to National Malleable and Steel Castings Company, Cleveland, Ohio, a corporation of Ohio Application October 29, 1948, Serial No. 57,244

11 Claims. (Cl. 214—1)

This invention relates to automatic jacket and weight shifters for snap flask mold conveyors, and deals more specifically with a modification of the jacket and the weight shifter mechanism disclosed and claimed in the application of Beauford E. Gavin, Sr., Serial No. 24,978, filed May 4, 1948.

When snap flasks are employed for forming sand molds in which metal castings are produced, the flasks are separated from the molds as soon as the latter are formed and jackets and weights of proper sizes are applied to the molds just prior to pouring. After the castings have hardened sufficiently to relieve the molds of the internal pressure of the molten metal, the jackets and weights are removed.

The jacket and weight shifter mechanism of the above identified application cooperates with a special form of snap flask mold conveyor, having a path that extends past molding, pouring and shakeout stations. By being properly located relative to the portion of the conveyor path along which the unpoured molds are transported to the pouring station and relative to the portion of said path along which the poured molds are transported while the castings are cooling, the jacket and weight shifter mechanism can function to transfer the jackets and weights from the poured molds to the unpoured molds as the molds register with different portions of the mechanism.

The jackets and weights are transferred with the shifter mechanism of the above identified application by means of a plurality of grapple units which travel in unison through a closed circular path and which are operated in proper timed relation with reference to their travel and to the travel of the molds carried by the trays of a snap flask mold conveyor. Each grapple unit operates during each complete cycle of the shifter mechanism to grip a jacket and its weight that are positioned on a traveling poured mold; to elevate the jacket and weight to remove them from the mold; to transport the elevated jacket and weight to a different location; to lower the jacket and weight onto an unpoured mold at said latter location; to release the lowered jacket and weight; and finally to return to the starting location where the jacket and weight gripping operation takes place.

The above referred to actuation of each grapple unit, to effect the gripping, elevating, lowering and releasing operation, is accomplished by means of a double-acting, pneumatic piston and cylinder unit which is controlled by a suitable valve mechanism that travels the same path as its grapple unit. Actuation of the valve mechanism in properly timed relation to its travel through said path brings about the properly timed operation of its grapple unit.

It is the primary object of this invention to provide an automatic jacket and weight shifter mechanism for snap flask mold conveyors which performs the same jacket and weight handling operations with a plurality of grapple units, as the shifter mechanism of the above identified application, but the actuation of each grapple unit to effect the jacket and weight gripping, elevating, lowering and releasing operations is accomplished with a novel form of mechanical means that causes the grapple arms of each unit to be operated with a more consistent and positive action than is possible with the pneumatic type of actuating mechanism in the aforesaid application.

Another important object of the invention is the provision of automatic jacket and weight shifter mechanism in which the mechanical means employed for actuating the plurality of grapple units are easily adjusted initially to cause all of the units to operate uniformly and in properly timed relation, and to enable said initial adjustments to be maintained with a minimum of attention or service.

A still further object of the invention is the provision of automatic jacket and weight shifter mechanism employing a plurality of jacket and weight handling grapple units mounted in spaced relation around a rotatable turntable frame and with each grapple unit being actuated, as a result of rotation of said turntable frame, to grip, raise, lower and release successive mold jackets and weights presented thereto by means of reciprocating motion producing mechanism that is actuated by suitable stationary cam means concentrically arranged with relation to the path of travel of the grapple units.

Other objects and advantages of the invention will be apparent during the course of the following description.

In the accompanying drawings forming a part of this specification and in which like numerals are employed to designate like parts throughout the same, Figure 1 is top plan view of the automatic jacket and weight shifter mechanism embodying this invention illustrated as being operatively associated with opposed portions of two runs of a snap flask mold conveyor.

Figure 4 is a horizontal view taken on line 4—4 of Fig. 3,

Figure 10:
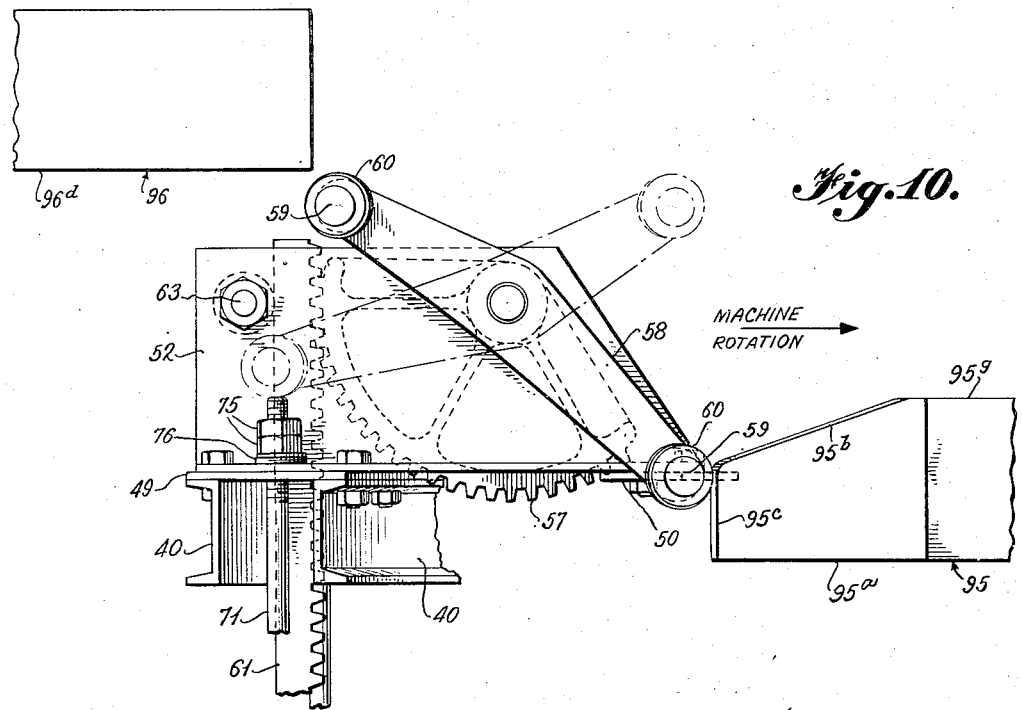
Figure 11:
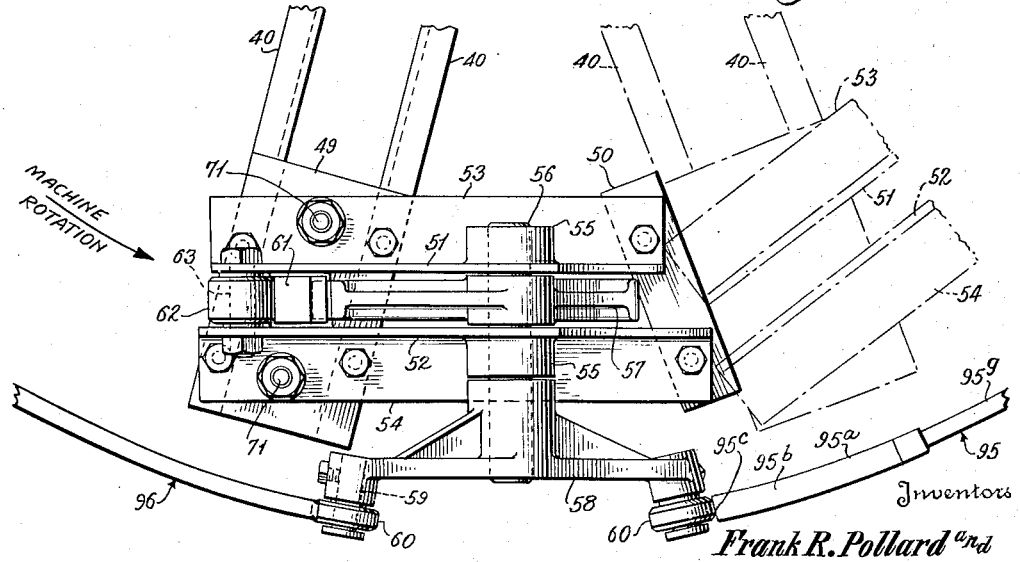

Figure 5 is a detail side elevational view of one of the grapple units that forms a part of the automatic jacket and weight shifted mechanism, Figure 6 is a vertical sectional view taken on line 6—6 of Fig. 5, Figure 7 is a horizontal sectional view taken on line 7—7 of Fig. 6, Figure 8 is a horizontal sectional view taken on line 8—8 of Fig. 6, Figure 9 is a detail vertical sectional view taken on line 9—9 of Fig. 6, Figure 10 is a detail side elevational view of the cam actuated rack and gear mechanism that is employed for actuating each grapple unit of the jacket and weight shifter mechanism, Figure 11 is a detail top plan view of the grapple unit actuating mechanism illustrated in Fig. 10, Figures 12 and 13 are fragmentary side elevational views of the grapple unit actuating mechanism shown in Figs. 10 and 11 and illustrate different positions assumed by the several parts of the unit during one complete cycle of operation of this actuating mechanism, Figure 14 is a diagrammatic view of the automatic jacket and weight shifter and its associated snap flask mold conveyor, and illustrates the relationship that exists between the number of jacket and weight handling grapple units provided on the shifter mechanism and the number of mold carrying cars incorporated in the snap flask mold conveyor, and Figure 15 is a diagrammatic view illustrating the opening and closing operations of the several grapple units that form a part of the automatic jacket and weight shifter mechanism.

Figure 1:
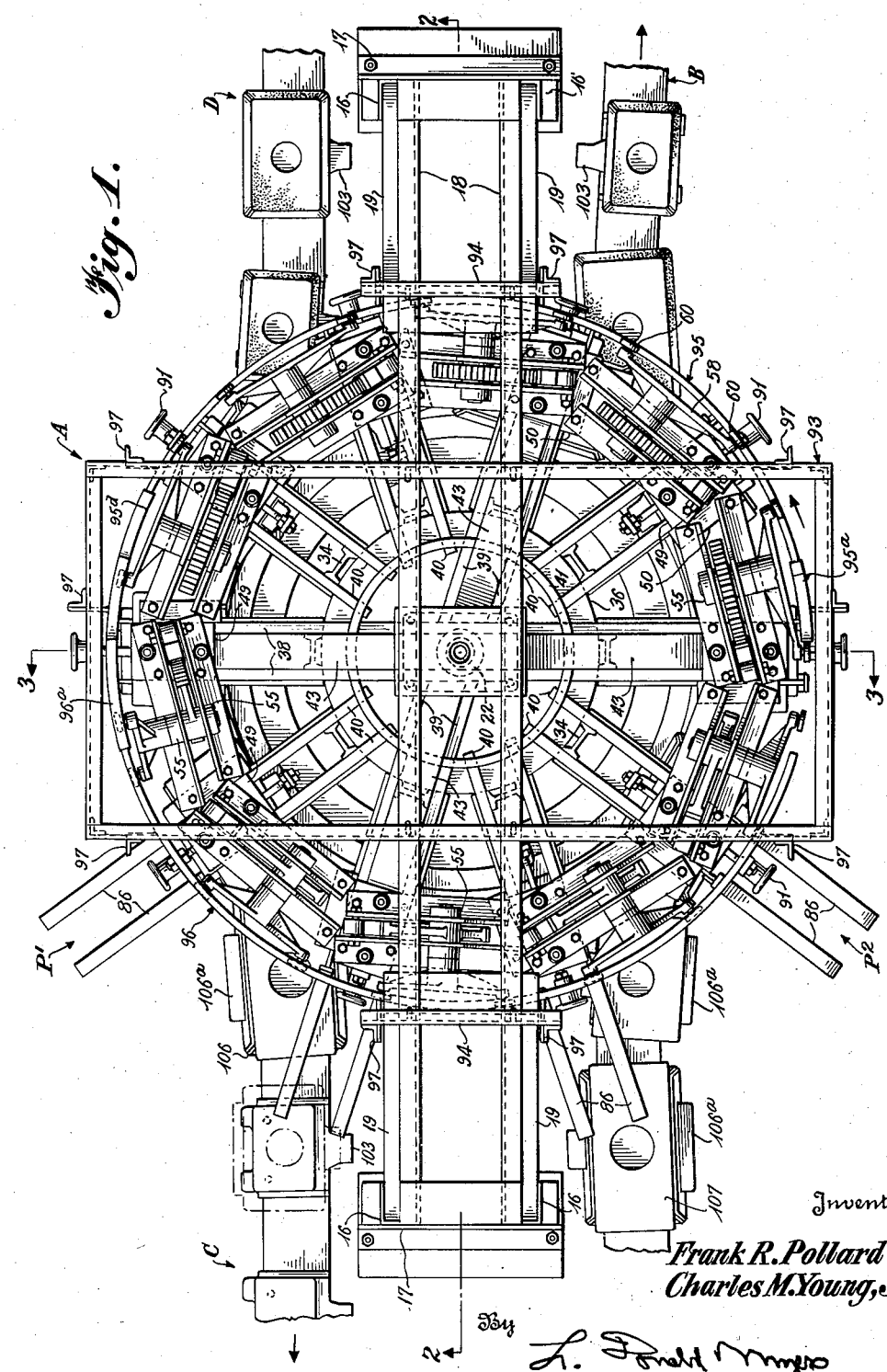

In the drawings, wherein for the purpose of illustration is shown the preferred embodiment of this invention, and first particularly referring to Figs. 1 and 14, it will be seen that the jacket and weight shifter mechanism, designated in its entirety by the reference character A, embodying this invention is operatively associated with a snap flask mold conveyor, designated in its entirety by the reference character B, which is made up of a series of wheeled trays interconnected by a suitable drive chain. The snap flask mold conveyor is laid out in an endless path that is diagrammatically illustrated in Fig. 14 as serving a pouring station C, a molding station D and a shakeout station E. The remainder of the path of the conveyor, from the end of the pouring station C to the shakeout station E, provides the cooling period for the poured castings.

By considering Figs. 1 and 14, it will be seen that the jacket and weight shifter mechanism A cooperates with the run of the conveyor that serves the pouring station C and the molding station D by being positioned between these two stations. The jacket and weight shifter mechanism also serves the opposite run of the conveyor path by being positioned at a suitable point or location relative to the length of the cooling zone for the poured castings.

Figure 2:
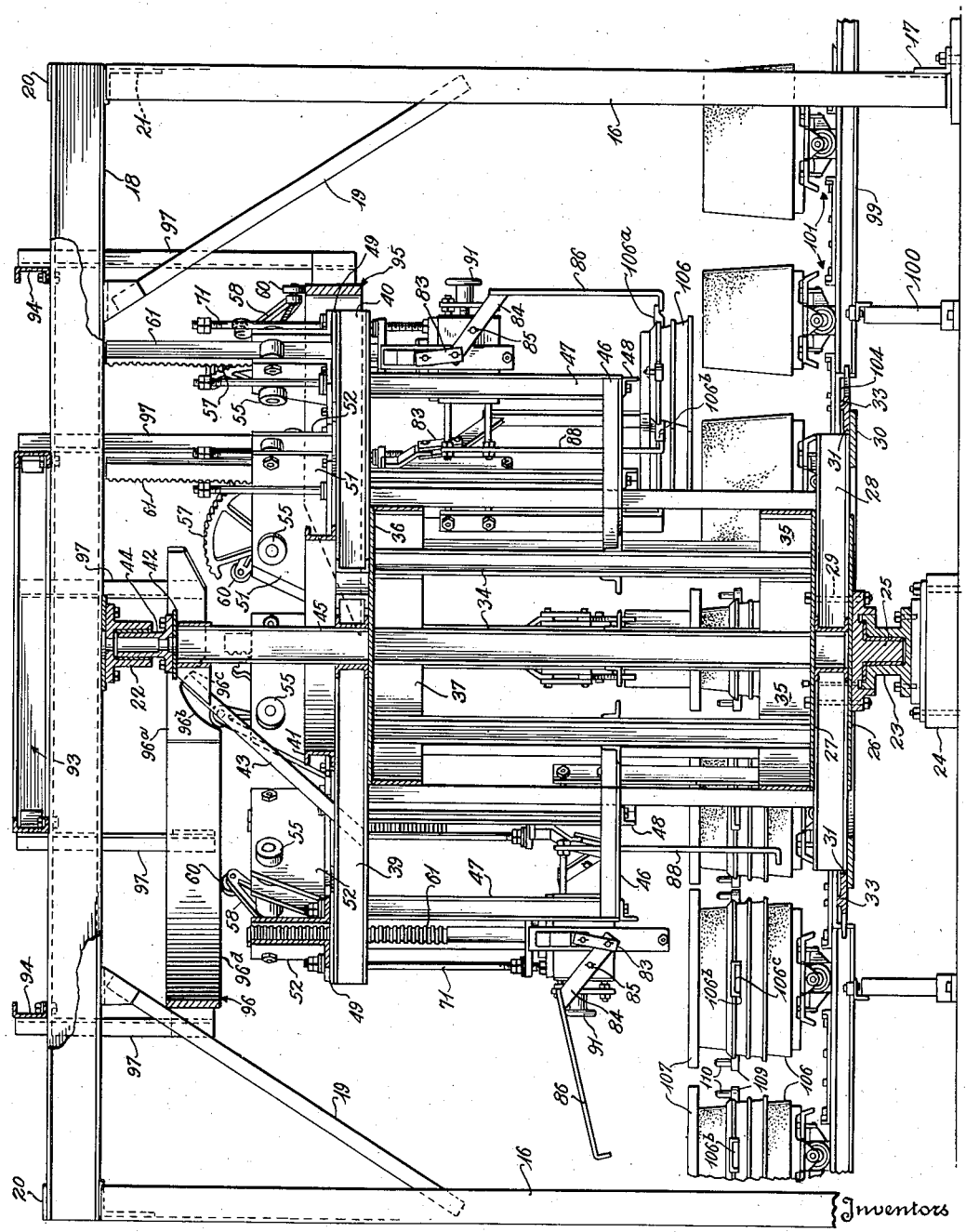
Figure 2 is a vertical sectional view taken on line 2—2 of Fig. 1.
Figure 3:
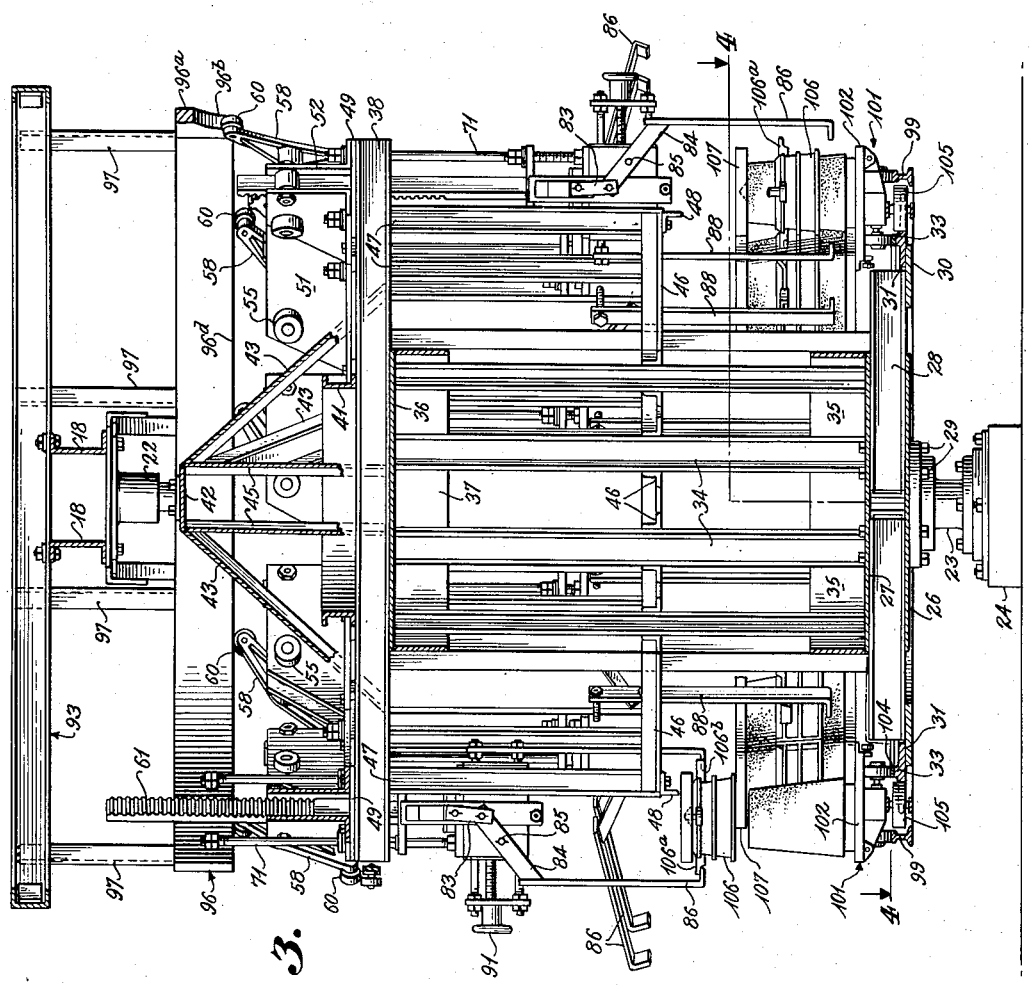
Figure 3 is a vertical sectional view taken on line 3—3 of Fig. 1.

By referring to Figs. 1, 2 and 3, it will be seen that the automatic jacket and weight shifter mechanism includes a stationary frame formed by the end uprights 16 that are suitably anchored at their lower ends to the foundry floor by the angles 17 and are suitably interconnected at their upper ends by the cross-beams 18. Corner braces 19 are suitably connected at their opposite ends to the uprights 16 and the cross-beams 18. By inspecting Fig. 1, it will be noted that two uprights 16 are provided at each end of the stationary frame and are arranged in spaced parallelism. Consequently, two cross-beams 18 are provided for connecting the upper ends of the two pairs of uprights 16. Cross-bracing plates 20 and angle members 21 are employed for interconnecting the two parallel parts of the stationary frame at the two upper corners.

Figs. 1, 2 and 3 disclose the two cross-beams 18 as having suitably attached to their middle portions the upper trunnion housing 22. Vertically and axially alined with this upper trunnion housing 23 is a lower trunnion housing 23 suitably attached to an elevated base 24 properly anchored to the foundry floor. The function of these axially alined trunnion housings 22 and 23 is to rotatably support the turntable frame of the automatic jacket and weight shifter mechanism.

Fig. 2 clearly illustrates the lower trunnion housing 23 as having journaled therein the pintle 25. Figs. 2, 3 and 4 best illustrate the base portion of the turntable frame as consisting of the lower and upper disc plates 26 and 27, respectively, which are spaced vertically to accommodate the inner end portions of the ten pairs of channel irons 28. The specific manner in which these pairs of channel irons radiate from the axis of the turntable frame is best illustrated in Fig. 4. The parallel plates 26 and 27, with the ten pairs of channel irons 28 interposed therebetween are fastened to the flange of the lower pintle 25 by the plurality of bolts and nuts 29.

The pairs of channel irons 28 have the ring 30 suitably attached to the lower faces of their outer end portions. The outside diameter of this ring is such that it projects radially outwardly beyond the outer extremities of the pairs of channel irons 28 to form an annular shelf that is employed for supporting the five sectors 31 of a toothed sprocket. Bolts, or the like, 32 are employed for securing the sectors 31 to the supporting ring 30. Each one of the sprocket sectors 31 is illustrated in Figs. 1 to 4, inclusive, as being provided with an arcuate rib 33 on its top surface. The ribs of all of the sprocket sectors collectively form an annular raised surface, the function of which will be described more in detail at a later point.

Figs. 1 to 4, inclusive, illustrate each pair of channel irons 28 as having positioned therebetween and suitably secured thereto the lower end portion of a vertical I-beam 34 that engages the periphery of the upper disc plate 27. Filler plates 35 are best illustrated in Figs. 2, 3 and 4 as being suitably connected to the peripheral portion of the disc plate 27 and to the lower portions of the vertical I-beams 34.

A top disc plate 36 is best illustrated in Figs. 1, 2 and 3 as being suitably connected at its peripheral edge to the upper end portions of the vertical I-beams 34. Suitably attached to and depending from the peripheral portion of this top disc plate 36 are filler plates 37 which bridge the spaces between and brace the upper end portions of the vertical I-beams 34.

It will be seen by considering Figs. 1 and 3 that a pair of parallel channel irons 38 are supported on the top disc plate 36 and extend entirely across the turntable frame to project at their outer end portions beyond the periphery of the sprocket that is formed on the base portion of the turntable frame by the five sectors 31. Two additional pairs of parallel channel irons 39 are illustrated in Figs. 1 and 2 as projecting radially of the axis of the turntable frame at diametrically opposite points. The inner end portions of these two pairs of channel irons 39 are supported on the top disc plate 36 and bear at their inner extremities against the outer sides of the two channel irons 38. Six additional pairs of parallel channel irons 40 are supported at their inner end portions on the top disc plate 36 and are arranged radially of the axis of the turntable frame.

By inspecting Fig. 1, it will be seen that ten pairs of radially projecting arms are formed by the several channel irons 38, 39 and 40, and that the outer end portions of each one of these pairs of arms project radially outward beyond the periphery of the sprocket formed by the several sectors 31. A flanged ring 41 is suitably fastened to the top faces of all of the pairs of channel irons, 38, 39 and 40 for the purpose of tying these elements together.

Figs. 1, 2 and 3 disclose a top plate 42 as being supported by four upwardly converging channel irons 43. These channel irons are connected at their lower ends to the pairs of channel irons 38 and 39 to form a spider for supporting the upper pintle 44 that is attached to the top plate 42 and is journaled in the top trunnion housing 22. To further brace the apex of this top pintle supporting spider, two parallel, vertically extending channel irons 45 are provided. The upper ends of these last mentioned channel irons are suitably attached to the top plate 42 while the lower ends are positioned between and suitably attached to the pairs of channel irons 38.

From the above description, it will be seen that a complete turntable frame has been described. This frame is supported for rotation about a vertical axis by the upper and lower trunnion and pintle assemblies.

The pairs of channel irons 38, 39 and 40 are described above as forming ten pairs of radially projecting arms with each pair of arms being provided with a vertical I-beam 34. Cooperating with the ten I-beams 34 and the ten pairs of radial arms, to form ten mounting frames for grapple units, are the ten pairs of horizontally, radially arranged angle irons 46 and the ten pairs of perpendicular channel irons 47. These elements 46 and 47 are best illustrated in Figs. 2, 3, and 5 to 9, inclusive. To be more specific, each pair of angle irons 46 have their inner ends suitably fastened to the opposite side flanges of a vertical I-beam 34 and their outer end portions attached to the lower ends of a pair of vertical channel irons 47. The upper ends of these last mentioned channel irons are suitably fastened to the overlying pair of radial arms formed by one of the horizontally arranged pairs of channel irons 38, 39 and 40. Transverse braces 48 interconnect the outer, lower corners of the grapple unit mounting frames that are former by the points of interconnection of the pairs of horizontal angle irons 46 and the pairs of vertical channel irons 47.

Figs. 1 to 3, inclusive, 5, 6, and 10 to 13, inclusive, disclose the outer end portions of each pair of radial arms, formed by the pairs of channel irons 38, 39 and 40, as having mounted thereon a plate 49. It will be seen by particularly inspecting Figs. 1 and 11 that these plates 49 rest on the top flanges of the pairs of channel irons 38, 39 and 40 and bridge the spaces formed therebetween. Figs. 1, 5, 10 and 11 disclose a flange plate 50 as projecting laterally from one of the two channel irons 38, 39 and 40 of each pair. Each plate 49 cooperates with the plate 50 that is positioned peripherally of the turntable frame in the direction of rotation of said frame, or in a counter-clockwise direction, to form a support for the parallel mounting plates 51 and 52. The main bodies of these mounting plates are vertically arranged and are elongated substantially circumferentially of the turntable frame. The mounting plates 51 and 52 are provided with bottom flanges 53 and 54, respectively, which are bolted, or otherwise suitably fastened, to the plates 49 and 50.

Each pair of mounting plates 51 and 52 is best illustrated in Figs. 1, 2, 3 and 11 as being provided with the alined hubs 55 that are positioned on, and are suitably attached to, the outer faces of the plates. These hubs 55 are bored in alinement with suitable openings formed in the main bodies of the plates 51 and 52.

The bores of the hubs 55, and the alined openings formed in the mounting plates 51 and 52, function to support a pivot shaft 56. Each one of these shafts 56 has suitably fastened thereto the hub portion of a gear segment 57 that is positioned between its associated mounting plates 51 and 52. The pivot shaft 56 projects radially outwardly beyond the hub 55 carried by the mounting plate 52 and has suitably fastened to its projecting end portion a double-armed cam follower 58. The outer end portion of each one of the two arms of this cam follower has fastened thereto a pin 59 on which is mounted a roller 60.

Each one of the gear segments 57 meshes with a vertically arranged rack 61 that is positioned between the vertical main bodies of the associated pair of mounting plates 51 and 52 and extends through a suitable opening formed in the plate 49. Each one of the vertical racks 61 is backed-up, and is maintained in meshing engagement with its gear segment 57, by means of a roller 62 journaled on a pin 63 passing through the mounting plates 51 and 52.

Figs. 2, 3, 6 and 13 best illustrate the fact that the lower extremity of each one of the vertical racks 61 is threadedly connected to a yoke 64. Figs. 5 and 6 best illustrate this yoke as having depending from its opposite longitudinal sides the two parallel guide bars 65 which are illustrated as being connected at their lower extremities by the bolt 66 and the spacer sleeve 67. Fig. 5 best illustrates the two guide bars 65 as having suitably fastened to the outer faces of their upper end portions the separate offset mounting lugs 68.

By inspecting Fig. 6, it will be seen that the opposite end portions of each yoke 64 are provided with smooth bored holes 69 for loosely receiving the threaded portions 70 of two parallel guide rods 71 that extend perpendicularly in parallelism for passing through the smooth bored holes 72 and 73 formed respectively in the associated plate 49 and the base flanges of the two mounting plates 51 and 52. The portion 70 of each one of these guide rods 71 has adjustably threaded thereon the pair of lock-nuts 74 which function as stops for the upward movement of the rack actuated yoke 64 relative to the guide rods 71.

The upper ends of the guide rods 71 are threaded for having adjustably mounted thereon the pairs of lock-nuts 75 which function to limit the downward movement of the guide rods relative to the top plate 49 and the base flanges of the mounting plates 51 and 52. Suitable cushioning washers 76 are interposed between the opposite end portions of each yoke 64 and the associated guide rod carried lock-nuts 74 and between the base flanges of the mounting plates 51 and 52 and the pairs of guide rod carried locknuts 75 to absorb impacted shocks.

The lower ends of the guide rods 71 are threadedly connected to the top plate 77 of a fabricated, box-like slide or a cross-head that additionally includes the parallel side plates 78 and the parallel end plates 79 and 80. By inspecting Figs. 7, 8 and 9, it will be seen that the side plates 78 are provided with vertical grooves 81 to receive the parallel channel irons 47 which form a part of the previously described grapple unit mounting frame. In other words, these parallel channel irons 47 act as guides for the vertical movement of the box-like slide or cross-head. The side walls 78, additionally, are provided with vertical grooves 82 to receive the guide bars 65 that were described as being attached at their upper ends to the yoke 64. It will be apparent, therefore, that the box-like slide or cross-head is permitted to move lengthwise of the parallel guide bars 65 and is limited in its relative movement in one direction by the spacer sleeve 67 and in the other direction by the yoke 64.

Figs. 2, 3, 5, 6, 12 and 13 best illustrate the offset lugs 68 as having pivotally connected to their lower ends the pairs of links 83 which in turn are connected at their outer or lower ends to the lever arms 84 pivotally mounted on the box-like slide or cross-head by the transverse pin 85. Figs. 2, 3, and 5 to 8, inclusive, disclose the outer ends of the lever arms 84 as having rigidly fastened thereto the two grapple arms 86.

By inspecting Figs. 5 to 9, inclusive, it will be seen that the end walls 79 and 80 of the box-like slide or cross-head have horizontally, freely movable therethrough the two supporting rods 87 which have fastened to their inner end portions the single grapple arm 88. A plate 89 is fastened to the outer ends of the two parallel supporting rods 87 and an adjusting screw 90 is shouldered at its outer end portion to bear against the plate 89 that connects the supporting rods 87 while an operating knob 91 is fastened to the reduced end of the screw 90 for clamping the plate 89 against the shoulder of said screw. The threaded portion of the screw 90 is threadedly connected to the outer end wall 79 of the box-like slide or cross-head.

It will be apparent, therefore, that by rotating the operating knob 91, the supporting rods 87 may be moved longitudinally relative to the box-like slide or cross-head for adjusting the setting or position of the inner grapple arm 88. This grapple arm can be adjusted between the limits illustrated by the solid line and the broken line positions of Fig. 6. This adjustment is desirable to accommodate mold jackets and weights of different widths.

The operation of each one of the ten grapple units best can be described by specifically referring to the disclosure of Fig. 6.

It will be developed more specifically at a later point in the description that the ten grapple units can be individually adjusted to handle any desired number of different sized jackets and weights up to a total of ten. Expressed in another way, each one of the ten grapple units can be adjusted to handle a different sized jacket and weight, or less than ten sizes can be handled by adjusting two or more of the grapple units to handle the same size jacket and weight. It will be understood that the inner grapple arm 88 of each unit is set or adjusted to a proper position to handle a given size jacket and its weight and is left in that adjusted position until its grapple unit is required to handle a different sized jacket and weight. It will be considered, therefore, that the grapple unit of Fig. 6 is set in its solid line position for handling the smallest size mold jacket and weight.

This same figure illustrates a solid line position for the two grapple arms 86, a broken line position for these arms in which they are swung outwardly and a second broken line position in which they are raised above and are in vertical alinement with the solid line position. It will be noted that the single grapple arm 88, also, is illustrated in a broken line position which is elevated to the same operative height and in parallelism with the last mentioned broken line position of the two grapple arms 86.

The grapple arms 86 and 88 occupy their solid line positions when the guide rods 71 are supported on the cushioning washers 76 that are associated with the lock-nuts 75 at the upper ends of the guide rods, or with the cushioning washers 76 engaging the top faces of the base flanges of the mounting plates 51 and 52. When the grapple arms 86 and 88 are in their solid line position, the rack 61, also, is positioned with its yoke 64 engaging the cushion members 76 associated with the guide rod carried lock-nuts 74. It will be understood that the position of the rack 61 illustrated in Fig. 6 may be considered as an intermediate one with reference to the complete cycle of operation of this rack. If the rack is moved downwardly from the position of Fig. 6, its connected yoke 64 will be caused to move downwardly away from the lock-nuts 74 and relative to the guide rods 71 which remain stationary because of the engagement of their upper lock-nuts 75 with the base flanges of the mounting plates 51 and 52. Because the box-like slide or cross-head is supported by the guide rods 71, it, also, remains stationary during this further downward movement of the rack 61 and its yoke 64. Downward movement of the yoke can continue until it engages and is stopped by the cushion member 92 mounted on the top plate 77 of the box-like slide or cross-head. This downward movement of the yoke 64 causes the grapple arms 86 to swing outwardly into their angularly arranged, broken line position as a result of the connections that are established between the yoke 64 and the inner ends of the lever arms 84 by the offset lugs 68 and the pairs of links 83.

When a set of grapple arms 86 and 88 is to be actuated to seize and lift a mold jacket and its weight, the associated gear segment 57 must be actuated in the proper direction by its double-armed cam follower 58 to cause the rack 61 meshing with the actuated gear segment to be raised. This movement of the rack 61 first causes the grapple arms 86 to swing into their solid line position of Fig. 6. The movement of the grapple arms 86 is accompanied by upward movement of the associated yoke 64 relative to the stationary guide rods 71 until the yoke engages the cushion members 76 that are backed up by the pairs of lock-nuts 74.

Further elevating movement of the rack 61 causes the yoke 64 to raise the guide rods 71 and the box-like slide or cross-head attached to the lower ends of these rods. This lifting of the boxlike slide or cross-head causes the grapple arms 86 and 88 to move upwardly from their solid line positions to their upper, broken line positions which causes the grapple arms to lift the mold jacket and its weight off of the mold.

When the lifted jacket and weight are to be placed onto another mold, the associated gear segment 57 is rotated in the opposite direction by its connected, double-armed cam follower 58. This rotation of the gear segment 57 brings about downward movement of its meshing rack 61, the yoke 64 supporting the guide rods 71 through the lock-nuts 74, and the slide or cross-head that is supported by the guide rods. Downward movement of the guide rods 71 and their supported slide or cross-head can continue until the lock-nuts 75, and their cushioning members 76 engage the base flanges of the two mounting plates 51 and 52. This engagement stops the downward movement of the guide rods 71 and their slide or cross-head. Further downward movement of the rack 61 causes the yoke 64 to move downwardly over the threaded portions 70 of the guide rods 71 and brings about outward swinging movement of the grapple arms 86 into the angular, broken line position of Fig. 6.

It will be seen that the lock-nuts 75 can be adjusted relative to the upper ends of the guide rods 71 to raise or lower the lower ends of the grapple arms 86 and 88 when they are in their solid line positions. The lower ends of the grapple arms should be so positioned that they will properly handle mold jackets and their weights when the jackets are placed directly on the conveyor trays; that is, without either molds or snap flask bottom boards being present on the trays. It, also, will be seen that the lock-nuts 74 can be adjusted along the threaded portions 70 of the guide rods 71 to vary the extent to which the grapple arms 86 will be swung outwardly.

It has been noted above that there are ten grapple units carried by the turntable frame in circumferentially spaced relation. It is to be understood that the invention is not limited to this exact number of grapple units because a greater or lesser number readily can be employed. The only restriction that should be noted is that there should be an even number of grapple units so they can be arranged in diametrically opposite pairs. It is desirable to have the grapple units arranged in this manner so one unit of each pair can be seizing and lifting a jacket and its weight at the same time the diametrically opposite grapple unit is lowering and releasing a jacket and its weight.

The improved form of actuating and controlling mechanism for effecting the above type of operation of all of the grapple units now will be described.

Figs. 1, 2 and 3 disclose a rectangular cam supporting frame 93 resting on and suitably attached to the top cross-beams 18 of the stationary frame. This cam supporting frame 93 is best illustrated in Fig. 1 as extending transversely of or normal to the length of the stationary main frame. Additional transverse channel bars 94 are supported on the tops of the cross-beams 18 outwardly of the opposite sides of the rectangular frame 93. These transverse bars 94 cooperate with the rectangular frame 93 for supporting two substantially semicircular cams 95 and 96 by means of vertical hangers 97.

The direction arrows 98 appearing on Figs. 14 and 15 indicate that the turntable frame rotates in a counter-clockwise direction. Cam 95 is illustrated in Figs. 2, 10, 12 and 13 as being located on a lower level than cam 96 and in Figs. 1 and 15 as extending from substantially the mid-center point of the side of the turntable frame, where the latter cooperates with the cooling run of the snap flask mold conveyor B, to substantially the diametrically opposite mid-center point, where the turntable frame cooperates with the portion of the snap flask mold conveyor that is located between the pouring station C and the molding station D. Figs. 1, 10, 11, 12 and 15 disclose the starting end portion of this lower cam 95 as being provided with a section 95a that is of greater width than the main portion of the cam. This section 95a is provided with an inclined top edge 95b and a vertical end edge 95c. This end of section 95a of the lower cam 95 cooperates with one arm of each double-armed cam follower 58 for effecting actuation of the associated gear segment 57 to raise or elevate the rack 61 that meshes with the gear segment. This end section 95a, therefore, will be referred to as the lifting end section of the lower cam 95.

The diametrically opposite end portion of the lower cam 95 is illustrated in Figs. 1, 13 and 15 as having an end section 95d which is of greater thickness than the main body portion of the lower cam 95. This end section 95d is provided with an inclined top edge 95f which cooperates with the same arm of the double-armed cam follower 58 for controlling rotation of the associated gear segment 57 in the proper direction to effect lowering of the rack 61 that meshes therewith. This end section 95d, therefore, will be referred to as the lowering end section.

Figs. 1 and 15 disclose the upper cam 96 as extending from an overlapping position with reference to the end section 95d of the lower cam to a diametrically opposite location where it terminates short of the lifting end section 95a of the lower cam. Figs. 2, 3 and 15 illustrate the starting end portion of the upper cam 96 as having a section 96a which is of greater thickness than the remainder of the length of this upper cam 96. This end section 96a of the upper cam has its lower edge cut away to form the arcuate or curved portion 96b and the inclined portion 96c. This cutaway or notch formation of the end section 96a of the upper cam 96 functions to control the final lowering movement of each rack 61 through the medium of the remaining arm of each double-armed cam follower 58. This end section 96a, through the medium of the cutaway or notched formation of this lower edge, also functions to reverse each double-armed cam follower 58. This end section 96a, therefore, will be referred to as the final lowering and reversing end section of the upper cam 96.

The upper edge 95g of the lower cam 95 and the lower edge 96d of the upper cam 96 function, respectively, to hold the racks 61 of the different grapple units in their raised and lowered positions as a result of the engagement of the cam follower arms therewith. It will be appreciated, of course, that the arms of the cam followers 58 are provided with the rollers 60 to materially reduce wearing of the contacting parts.

The end sections 95a, 95d and 96a are increased in thickness to take care of the radial displacement, or bodily movement, of the rollers 60 that occurs each time a double-armed cam follower is pivoted about the axis of its shaft 56. This radial displacement results from the change in radius, or radial distance, between the center of rotation of the turntable frame and the rollers 60 that takes place when the movement of a roller changes from simple rotation about its axis to bodily pivotal movement about the axis of its cam follower shaft 56.

The actuation of the rack 61 of each grapple unit, as a result of engagement of the rollers 60 of the cam follower arms with the active edges of the lower and upper cams 95 and 96, to bring about movement of the grapple arms 86 of the unit into the three positions illustrated in Fig. 6, and to bring about the movement of the grapple arm 88 into its two vertically alined positions, will be explained specifically by referring to Figs. 10 to 13 in combination with Fig. 6.

The angularly arranged broken line position of the grapple arms 86 in Fig. 6 corresponds with the lowest position assumed by the associated rack 61. The rack is illustrated in this lowest position in Figs. 10 and 11 and in the solid line showing of Fig. 12. It will be remembered that the grapple arm 88 occupies its solid line position of Fig. 6 when the grapple arms 86 are in their angular, broken line position. The grapple arms 86 and 88 assume these last mentioned positions after they have deposited a mold jacket and its weight onto an unpoured mold and the grapple arms remain in this position until the turntable frame rotates approximately 180°, or until the grapple unit in question approaches the position, relative to the snap flask mold conveyor, where a jacket and its weight are to be removed from a poured mold. By inspecting Figs. 1, 2 and 3, it is possible to determine the portion of the rotation of the turntable frame during which the grapple arms 86 are in their broken line angular position. The rack 61 is retained in its lowest position, or at the bottom limit of its travel, by the roller 60 carried by the trailing arm of the double-armed follower 58 engaging the holding edge 96d of the upper cam 96. It is necessary to provide a holding cam surface to retain the racks 61 at their lower limits to counteract the weight of the grapple arms 86 while the latter are occupying their angular, broken line positions of Fig. 6.

Figs. 10 and 11, and the solid line position of Fig. 12 illustrate the double-armed cam follower 58 of one grapple unit just after the roller 60 of its trailing arm has left the holding bottom edge 96d of the upper cam 96. These same figures, also, illustrate the roller 60 on the leading arm of the double-armed cam follower in engagement with the vertical end edge 95c of the lifting end section 95a of the lower cam 95.

As the turntable frame continues to rotate in the direction indicated in Figs. 10 to 12, inclusive, the roller 60 carried by the leading arm of the illustrated double-armed follower 58 is caused to travel downwardly over the vertical cam surface 95c. This downward movement of the roller 60 is illustrated in the first two broken line positions of Fig. 12 which are located to the right of the solid line position. This downward travel of the cam follower roller causes the associated gear segment 57 to be rotated in a clockwise direction which effects upward travel of the meshing rack 61.

As a result of this partial upward travel of the rack 61, the associated grapple arms 86 are caused to move from their angular, broken line position into their solid line position of Fig. 6. The grapple arms 86 now are positioned in parallelism with the grapple arm 88 and all of the grapple arms are ready to be raised to lift a mold jacket and its weight from a poured mold.

Continued rotation of the turntable frame in its counterclockwise direction of movement causes the roller 60 of the leading arm of the double-armed follower 58 to travel back up the end edge 95c and then to travel longitudinally of the inclined lifting edge 95b of the end section 95a of the lower cam 95. This movement of the leading cam follower roller 60 upwardly along the edges 95c and 95b causes the associated gear segment 57 to be further rotated in a clockwise direction with the result that the meshing rack 61 is further elevated. The remaining two broken line positions illustrated in Fig. 12 depict this further raising movement of the associated rack. When the cam follower roller 60 finally reaches the holding top edge surface 95g of the lower cam 95, the associated arm of the cam follower becomes the trailing arm. The holding edge 95g cooperates with the engaging cam follower roller to retain the rack in its uppermost position.

During this upward movement of the rack 61, the connected box-like slide or cross-head has been raised and the grapple arms 86 and 88 have gripped or seized a mold jacket and its weight and have elevated the same from the poured mold. Elevated jackets and weights are illustrated at the right-hand portion of the showing of Fig. 2. It will be appreciated that the continued engagement of the cam follower roller 60 with the holding top edge surface 95g of the lower cam 95 functions to support the mold jacket and its weight during rotation of the turntable frame almost 180°.

The solid line position at the left of Fig. 13 shows the trailing cam follower roller 60 as it approaches the end of the holding top edge surface 95g of the lower cam. In other words, this trailing cam follower roller 60 is just about to engage the inclined top edge 95f of the lowering end section 95d of the lower cam 95.

As the turntable frame continues to move in a counterclockwise direction, the trailing cam follower roller 60 will start to move down the inclined top edge 95f of the lowering end section 95d. This downward movement of the trailing cam follower roller 60 is accompanied by upward movement of the leading cam follower roller 60. This leading roller will eventually engage the lower starting end of the inclined edge surface 96c formed in the final lowering and reversing end section 96a of the upper cam 96.

The first broken line position, shown in Fig. 13 to the right of the solid line position, illustrates the roller 60 of the trailing cam follower arm at the extreme lower end of the inclined surface 95f of the lower cam 95 and the roller 60 of the leading arm of the cam follower approximately half-way up the length of the inclined cutaway edge 96c.

This angular movement of the double-armed cam follower 58 is accompanied by rotation of the associated gear segment 57 in a counterclockwise direction for effecting lowering of the meshing rack 61. These positions of the described elements correspond with the positions illustrated in Fig. 12, or when the leading cam follower roller 60 is at the lower end of the vertical end edge 95c of the lifting end section 95a of the lower cam 95. When the various parts are in this particular position, the grapple arms 86 and 88 occupy their solid line positions of Fig. 6.

Further travel of the turntable frame in its counterclockwise direction causes the roller 60 on the leading or upper cam follower arm to travel along the remainder of the inclined cam edge 96c and to travel the full length of the curved or arcuate edge 96b until this roller finally engages the bottom holding edge 96d of the upper cam 96.

This travel of the upper cam follower roller 60 along the lower edge portions 96c and 96b brings about further counterclockwise rotation of the associated gear segment 57 to return the meshing rack 61 to its lowest position in which the grapple arms 86 are caused to assume their angular, broken line position. It will be noted that the double-armed cam follower 58 now has been returned to the position illustrated in Figs. 10 and 11 and in the solid line showing of Fig. 12. The holding bottom edge 96d of the upper cam retains the rack 61 in this lowest position until the trailing cam follower roller, which now is the upper roller, reaches the end of the upper cam 96.

The snap flask mold conveyor cooperating with the automatic jacket and weight shifter mechanism that has just been described in detail best can be understood by specifically referring to Figs. 1 to 4, inclusive, 14 and 15.

The general path of the mold conveyor is illustrated diagrammatically in Fig. 14. This path is defined by the parallel track rails 99 which are supported at a proper elevation and at suitably spaced intervals by the legs 100.

A desired number of two-wheeled, chain connected trucks 101 are supported on the rails 99, at suitably spaced intervals, for travel therealong. Each one of these trucks is provided with a tray 102 that is pivoted for vertical swinging movement to dump a mold and its casting off of the tray at the shakeout station E, illustrated in Fig. 14, when its projecting arm 103 engages a suitable dumping cam, not shown. The detail features of construction of the snap flask mold conveyor are more completely illustrated and described in the above referred to Beauford E. Gavin, Sr., application, Serial No. 24,978, and reference may be made to that application for a better understanding of the same.

By particularly considering Figs. 2 to 4, inclusive, it will be seen that the outside track rail 99 is curved outwardly at opposite sides of the turntable frame of the automatic jacket and weight shifter mechanism so as to carry the snap flask mold conveyor trucks around the base portion of said turntable frame.

The inside track rail 99, however, is interrupted or cut off adjacent the periphery of the base sprocket of the turntable frame so that its ends will clear the teeth that are formed on the sprocket sectors 31. To support the inside truck wheels while traveling over the opposite sides of the turntable sprocket, arcuate rail strips 104 are provided. These stationary rail strips are suitably joined at their outer ends to the cut-off ends of the inner track rail 99 and are supported by the annular assembly of upstanding ribs 33 that were previously described as being formed on the sectors 31 of the turntable frame sprocket. These rail strips 104 are best illustrated in Figs. 2, 3 and 4.

Figs. 3 and 4 illustrate the drive chain of the conveyor as being provided with guide rolls 105 which are mounted for rotation on the vertical chain pins that connect the adjacent ends of the chain links. These guide rolls 105 mesh with the teeth of the base sprocket of the turntable. It will be appreciated, therefore, that the snap flask mold conveyor chain, which is driven by any suitable form of drive mechanism not shown, is employed for rotating the turntable frame and its grapple unit in proper synchronism with the travel of the snap flask mold conveyor trays. This synchronized operation of the automatic jacket and weight shifter mechanism relative to the travel of the conveyor trays is very important to assure proper engagement of the grapple arms 86 and 88 with the jackets and their weights to enable the latter to be removed from poured molds and properly applied to unpoured molds without damaging the molds.

It, also, is very important that the mold conveyor trucks, with their trays, be arranged exactly diametrically opposite each other when they are positioned on opposite sides of the turntable frame of the automatic jacket and weight shifter mechanism. This feature is best illustrated in the diagrammatic showing of Fig. 14 in which the trays of the conveyor are arbitrarily numbered from 1 to 10, inclusive, and the locations of the grapple units of the turntable frame are similarly numbered. It will be seen that the conveyor trays bearing numbers 1 and 6 should be diametrically opposite each other when they are at their median positions while bending around the opposite sides of the turntable frame sprocket. This same type of diametrical registration should occur for trays 2 and 7, 3 and 8, 4 and 9, and 5 and 10 during the travel of the conveyor and the rotation of the turntable.

To maintain this type of exact diametrical registration of the conveyor trays on opposite sides of the turntable frame, an adjustment is provided for the left-hand turn or bend of the conveyor, as seen in Fig. 14. In other words, by anchoring the turntable frame so that it will not rotate, and by properly positioning and holding conveyor tray 6 at the exact median position illustrated in Fig. 14, adjustment of the left-hand bend or turn of the conveyor path in the proper direction will cause conveyor tray 1 to be properly positioned at the opposite median position, or exactly diametrically opposite tray 6. Any ordinary tensioning of the conveyor chain, to take care of wear, or the like, is accomplished by the adjustment indicated at the right-hand end of the conveyor path shown in Fig. 14.

It will be remembered from the detail description of the grapple unit illustrated in Figs. 5 to 9, inclusive, that the non-pivoting, inside grapple arm 88 is adjustable radially of the turntable frame to accommodate jackets and weights of different sizes while the pivoted grapple arms 86 are not adjustable for jacket size. It will be appreciated, therefore, that molds of different sizes must be uniformly positioned on the conveyor trays so that their outer sides, regardless of the difference in sizes of the molds, will bear the same relationship to the outer, pivoted grapple arms 86.

This uniform positioning of all of the molds on the conveyor trays is accomplished by providing the conveyor trays and the mold bottom boards with interengaging elements or structural formations, not shown. Figs. 1 and 4 disclose several different sized molds which are all uniformly positioned on the conveyor trays so that their outer sides or faces are in longitudinal alinement while traveling through a straight run or portion of the conveyor path.

Figs. 1 to 6, inclusive, illustrate jackets 106 and associated weights 107 being handled by the automatic jacket and weight shifter mechanism. Figs. 2, 3 and 4 disclose each mold jacket 106 as having a relatively long gripping lug 106a fastened to its outer, longitudinal side which is intended to cooperate with the two grapple arms 86 of a grapple unit. The opposite longitudinal side of each jacket is provided with a gripping lug 106b which is best illustrated in Figs. 3 and 6 as being formed with a bottom recess 106c for accommodating the single, inner grapple arm 88 of a grapple unit.

Figs. 5 and 6 best illustrate the fact that each jacket 106 is provided with longitudinally outwardly projecting ears 109 at its opposite ends which are provided with upstanding pins 110. These pins are adapted to enter the conical recesses 111 formed in the opposite ends of the weights 107 for the purpose of properly positioning the weights relative to the jackets when the weights are lifted off of poured and partially cooled molds by the elevating of the jackets. These pins and recesses also assure proper positioning of the weights on the tops of unpoured molds when the associated jackets are applied thereto.

The mode of operation of the automatic jacket and weight shifter mechanism embodying this invention now will be described.

It was pointed out above that the grapple units of the automatic jacket and weight shifter mechanism can be adjusted or set to handle different sized jackets and their weights for use with a corresponding number of different sized molds. It is possible to adjust or set the illustrated number of grapple units so they will handle a maximum of ten different sizes of jackets and their weights. It will be appreciated that the maximum number of different sizes of jackets and weights that can be handled at any one time is limited by the number of grapple units that are mounted on the turntable frame. Of course, any desired smaller number of different sizes of jackets and weights can be handled at any one time by reducing the number of grapple units carried by the turntable frame or by retaining the illustrated number of grapple units and adjusting or setting certain units to handle the same size of jacket and its weight.

It will be appreciated that the inner grapple arms 88 for the several grapple units will travel circular paths of different diameters, depending upon the sizes of jackets and weights they are adjusted or set to accommodate. The outer grapple arms 86, however, will all follow the same irregular path or pattern, regardless of the differences in the sizes of jackets and weights being handled.

Figs. 1 and 15 best illustrate the irregular path or pattern followed by all of the outer grapple arms 86. This path of travel is represented by solid line G in Fig. 15. Starting with the point P¹ on line G of Fig. 15, which point is further illustrated in Fig. 1, it will be understood that a jacket and its weight have been applied to an unpoured mold and the end sections 95d and 96a, of the lower and upper cams 95 and 96, respectively, have actuated the rack 61 of the grapple unit, illustrated as occupying position P¹, to bring about this desired application of the jacket and weight.

The outer grapple arms 86 will remain in their extended, or angular broken line position of Fig. 6, while traveling from the point P¹ to the point P² on line G, see Fig. 15. This point P², also, is further illustrated on Fig. 1.

From point P² to point P³, on line G of Fig. 15, the lifting end section 95a of the lower cam rail 95 will actuate the cam follower and its associated gear segment to lift or elevate the meshing rack 61 to its uppermost position for causing the two outer grapple arms 86 to move downwardly into their solid line position of Fig. 6 and to then be elevated, along with the grapple arm 88, to their upper, broken line positions of Fig. 6.

It will be appreciated, by inspecting Fig. 1, that a poured mold, with its casting hardened sufficiently to remove the internal pressure from the mold, has been presented to the grapple unit, as it arrives at the position indicated by point P² in Fig. 15, by the snap flask mold conveyor A. This poured mold advances in synchronism with the grapple unit to which it was presented until the grapple unit reaches the point P³. During this travel, the grapple unit has gripped or seized the jacket positioned on the poured mold and has lifted that jacket and its associated weight up off of the mold.

While traveling from point P³ to point P⁴, the grapple unit retains the seized and elevated jacket and weight at their uppermost limit of movement. The holding top edge 95g of the lower cam 95 cooperates with the cam follower 58, associated with the grapple unit in question, for retaining the jacket and weight in their extreme elevated position.

While traveling from point P⁴ to point P¹, each grapple unit is actuated to lower its jacket and associated weight onto an unpoured mold that is presented to the grapple unit by the snap flask mold conveyor A. The lowering end section 95d of the lower cam 95 and the final lowering and reversing end section 96a of the upper cam 96 cooperate with the cam follower 58 and its actuated gear segment 57 to bring about this lowering and releasing operation of the grapple unit.

It will be appreciated that if an unpoured mold is not placed on a tray of the conveyor by the time the tray has passed through the molding station D, the jacket and weight for that particular conveyor tray will be deposited on the tray and will be carried through the pouring station and the first part of the cooling zone by the conveyor. It will be appreciated, therefore, that the conveyor trays are employed to store the jackets and weights that are not required for a given cycle of travel of the conveyor through the pouring station.

It will be seen, from the detail description applied to the disclosure of Fig. 14, that the snap flask mold conveyor A must be provided with mold carrying trays that are equal in number to any desired multiple of the ten grapple units assembled around the turntable frame of the automatic jacket and weight shifter mechanism. It can be considered, therefore, that any desired number of groups of conveyor trays are provided and that each group consists of ten trays.

To make certain that the molders place the proper sized molds on the proper conveyor trays so that the proper sized jackets and weights will be applied to the molds by the automatic jacket and weight shifter mechanism, it is necessary to apply some form of designation to each one of the ten different conveyor trays to distinguish the trays from each other. The application of distinguishing colors to the ten different conveyor trays of each group has been found to be the simplest method. Therefore the ten trays of each group will bear an equal number of different designating colors while the trays bearing the same numbers in the different groups will have the same colors applied thereto.

This method of distinguishing between the different trays of each group makes it possible to assign a given color to a certain molder so that he will place all of his molds, which are made with the same size snap flask, only on the conveyor trays that bear his color. This assures the placing of proper sized unpoured molds on the proper conveyor trays of each group so that jackets and weights of proper size will be applied to the molds.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, we claim:

1. Mechanism for shifting jackets and their associated weights from poured to unpoured molds presented to different portions of the mechanism by a snap flask mold conveyor, comprising a turntable frame mounted for rotation about a vertical axis, a plurality of vertically arranged grapple units spaced around and supported on said frame; each grapple unit comprising opposed depending grapple arms adapted to be moved relative to each other radially of said frame into and out of jacket and weight gripping position and to be moved in unison vertically of said frame to raise and lower the gripped jacket and weight, a vertically movable support for the grapple arms carried by the turntable frame, and mechanical means carried by the turntable frame and operatively connected with the grapple arm support and the grapple arms for moving the support and arms vertically and for moving the grapple arms relative to each other; and stationary means concentric with, adjacent to the path of travel of and continuously engaged by all of the mechanical means of the grapple units and operating as a result of rotation of the turntable frame for directly imparting to the mechanical means of each grapple unit the motivating force required to move its grapple arms both vertically and relative to each other.

2. Mechanism for shifting jackets and their associated weights from poured to unpoured molds presented to different portions of the mechanism by a snap flask mold conveyor, comprising a turntable frame mounted for rotation about a vertical axis, a plurality of grapple units spaced around and supported on said frame; each grapple unit comprising opposed grapple arms adapted to be moved relative to each other into and out of jacket and weight gripping position and to be moved in unison to raise and lower the gripped jacket and weight, a vertically movable support for the grapple arms carried by the turntable frame, and mechanical means carried by the turntable frame and including a gear and rack for converting rotary motion into reciprocating motion operatively connected with the grapple arm support and the grapple arms for moving the support and arms vertically and for moving the grapple arms relative to each other; and stationary cam means surrounding the turntable frame so as to be concentric with and adjacent to the path of travel of the mechanical means of the grapple units and operating as the result of rotation of the turntable frame for actuating the mechanical means of each grapple unit.

3. Mechanism for shifting jackets and their associated weights from poured to unpoured molds presented to different portions of the mechanism by a snap flask mold conveyor, comprising a turntable frame mounted for rotation about a vertical axis, a plurality of grapple units spaced around and supported on said frame; each grapple unit comprising opposed grapple arms adapted to be moved relative to each other into and out of jacket and weight shifting position and to be moved in unison to raise and lower the gripped jacket and weight, a vertically movable support for the grapple arms carried by the turntable frame, and mechanical means carried by the turntable frame and operatively associated with the grapple arm support for moving the support vertically relative to the frame and for moving the grapple arms relative to each other, said mechanical means including a gear, a rack meshing with the gear, means for operatively connecting the rack to the grapple arm support and to one of said grapple arms, and a double-armed lever for rotating the gear; and stationary cam means surrounding the turntable frame so as to be mounted concentrically of the path of travel of the grapple units, said cam means comprising two vertically spaced cams separately engageable by the different arms of the double-armed levers during each revolution of the turntable frame for actuating the mechanical means of all of the grapple units.

4. Mechanism for shifting jackets and their associated weights from poured to unpoured molds presented to different portions of the mechanism by a snap flask mold conveyor, comprising a turntable frame mounted for rotation about a vertical axis and having a plurality of circumferentially spaced mounting frames, a grapple unit supported on each of said mounting frames; each grapple unit comprising opposed grapple arms adapted to be moved relative to each other into and out of jacket and weight gripping position and to be moved in unison to raise and lower the gripped jacket and weight, a cross-head supported on the mounting frame for vertical movements, means for mounting the relatively movable grapple arms on the cross-head, a yoke supported on the mounting frame for vertical movements, a lost-motion connection between the yoke and the cross-head, means operatively connecting the yoke to certain of the grapple arms to effect movement of said arms relative to the cross-head when the yoke and cross-head are moved relative to each other through the range of said lost-motion connection, and mechanical means for moving the yoke vertically a greater distance than the cross-head is permitted to move whereby the yoke and the cross-head will move together for a portion of the distance of movement of the yoke and will move relative to each other for the remainder of said distance, said mechanical means comprising a gear having an operating arm, rotatably supported on the mounting frame and a rack meshing with the gear and connected to the yoke; and stationary means concentric with the path of travel of the grapple units and operating as a result of rotation of the turntable frame relative thereto for effecting actuation of the gear operating arm of each grapple unit.

5. Mechanism for shifting jackets and their associated weights from poured to unpoured molds presented to different portions of the mechanism by a snap flask mold conveyor, comprising a turntable frame mounted for rotation about a vertical axis and having a plurality of radially projecting mounting frames spaced circumferentially therearound, a grapple unit supported on each of said mounting frames; each grapple unit comprising opposed grapple arms adapted to be moved relative to each other into and out of jacket and weight gripping position and to be moved in unison to raise and lower the gripped jacket and weight, a cross-head supported on the mounting frame for vertical movements, means for separately mounting the relatively movable grapple arms on the cross-head, a yoke supported on the mounting frame for vertical movements, a lost-motion connection between the yoke and the cross-head, means operatively connecting the yoke to certain of the grapple arms to effect movement of said arms relative to the cross-head when the yoke and the cross-head are moved relative to each other as a result of said lost-motion connection, and mechanical means for moving the yoke vertically a greater distance than the cross-head is permitted to move whereby the yoke and the cross-head will move together for a portion of the distance of movement of the yoke and will move relative to each other for the remainder of said distance, said mechanical means comprising a gear, a rack meshing with the gear and connected to the yoke, and a double-armed lever for rotating the gear; and stationary cam means mounted concentrically of the path of travel of the grapple units, said cam means comprising two vertically and circumferentially spaced substantially semi-circular cams separately engageable by the different arms of the double-armed levers during each revolution of the turntable frame for actuating the mechanical means of all of the grapple units.

6. In a jacket and weight shifter mechanism for a snap flask mold conveyor, the improvement which comprises a frame mounted for rotation about a vertical axis and including vertical guide means, a cross-head movable vertically on said guide means, opposed grapple arms adapted to be moved relative to each other so that they can be operated to successively grip, hold and release a mold jacket and its associated weight during rotation of said frame, means for mounting one of the grapple arms of the cross-head for selective horizontal adjustments to permit the opposed grapple arms to handle jackets and weights of different sizes, means for pivotally mounting the remaining grapple arms on the cross-head, mechanical means carried by the rotatable frame for raising and lowering the cross-head with the grapple arms and for effecting the aforesaid relative movement of the grapple arms by actuating the pivotally mounted arms, said mechanical means including a vertically movable member having a lost-motion connection with the cross-head and a link and lever connection with the pivotally mounted grapple arms, a rotatable member drivingly connected to the vertically movable member for actuating the latter, and arm means for actuating the rotatable member, and stationary means cooperating with the said actuating arm means throughout its entire path of travel during rotation of said frame for producing the desired operation of the mechanical means.

7. In foundry equipment of the type described, a jacket and weight shifter for a snap flask mold conveyor comprising a turntable frame supported for rotation about a vertical axis, a plurality of grapple units carried by the turntable frame in circumferentially spaced relation, each grapple unit comprising opposed grapple arms adapted to be moved relative to each other to seize and release a mold jacket and weight and to be moved in unison to lift and lower the seized mold jacket and weights and means for actuating the grapple units in proper timed relation to the rotation of the turntable frame to cause each grapple unit to seize and lift a mold jacket and weight at one location during each revolution of the turntable frame and to lower and release said mold jacket and weight at a different location during the same revolution of the turntable frame, said grapple unit actuating means comprising stationary cam means concentric with the axis of rotation of said turntable frame and common to all of the grapple units, a gear and rack operating mechanism for each grapple unit to apply reciprocating motion to the unit, a follower engageable with the cam means for rotating the gear, means for providing a lost-motion connection between the rack and the grapple arms through which the arms are raised and lowered, and means providing a direct-motion connection between the rack and the grapple arms to move the grapple arms relative to each other during the lost-motion movements between the rack and the grapple arms.

8. A jacket and weight shifter mechanism as specified in claim 6 further characterized by the stationary means comprising one cam positioned below the path of travel of and engageable by the arm means during a fractional portion of each revolution of the turntable frame, and a second cam positioned above the path of travel of and engageable by the arm means during a different fractional portion of each revolution of the turntable frame.

9. A jacket and weight shifter mechanism as specified in claim 7 further characterized by the stationary cam means comprising one substantially semi-circular cam positioned below the path of travel of and engageable by the follower during a fractional portion of each revolution of the turntable frame, and a substantially semi-circular cam positioned above the path of travel of and engageable by the follower during a different fractional portion of each revolution of the turntable frame.

10. Mechanism for shifting mold jackets and their associated weights, comprising a turntable frame mounted for rotation about a vertical axis and provided with a plurality of circumferentially spaced vertically extending mounting frames; a grapple unit carried by each one of said mounting frames, each grapple unit comprising a support vertically movable on its mounting frame, a pair of opposed grapple arms depending from the support for movements relative to each other into and out of jacket and weight gripping position when the support is in its lowest position and for movements in unison with each other to raise and lower the gripped jacket and weight when the support is moved vertically, a vertically movable rack supported by the mounting frame, means movably supported by the mounting frame for determining the lowest position of the grapple arm support and for providing a lost-motion connection through which the rack vertically moves the grapple arm support, means actuated by the lost-motion movements between the rack and the grapple arm support for effecting said relative movements of the opposed grapple arms, a rotatable gear meshing with the rack, and a double-armed lever for rotating the gear in opposite directions to raise and lower the rack; a stationary cam surrounding a portion of the turntable frame and engageable by one arm of each double-armed lever during each revolution of the turntable frame to effect certain movements of the meshing rack, and a stationary cam surrounding a different portion of the turntable frame and engageable by the other arm of each of said levers during each revolution of the turntable frame to effect the remaining movements of the meshing rack.

11. A jacket and weight shifter mechanism as specified in claim 10 further characterized by the two stationary cams each being of substantially semi-circular shape, and means for supporting the cams in vertically spaced planes located one above and one below the path of travel of all of the double-armed levers of said grapple units so that the lower cam, when engaged by a lever, will hold the associated rack in its raised position and the upper cam, when engaged by a lever, will hold the associated rack in its lowered position.

FRANK R. POLLARD.
CHARLES M. YOUNG, JR.

REFERENCES CITED

The following references are of record in the file of this patent:

UNITED STATES PATENTS

| Number | Name | Date |
| --- | --- | --- |
| 679,183 | McKee | July 23, 1901 |
| 870,713 | Christianson | Nov. 12, 1907 |
| 1,330,524 | Freud | Feb. 10, 1920 |
| 1,921,389 | Ingle | Aug. 8, 1933 |
| 2,229,800 | Dean | Jan. 28, 1941 |